(12) United States Patent
Schroeder et al.

(10) Patent No.: US 7,585,559 B2
(45) Date of Patent: Sep. 8, 2009

(54) FOAM BARRIER HEAT SHIELD

(75) Inventors: Jeffrey J. Schroeder, Cleveland, OH (US); Bradley D. McDonel, Cleveland, OH (US); Scott A. Churby, West Salem, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 794 days.

(21) Appl. No.: 10/806,643

(22) Filed: Mar. 23, 2004

(65) Prior Publication Data

US 2004/0247857 A1 Dec. 9, 2004

Related U.S. Application Data

(60) Provisional application No. 60/475,560, filed on Jun. 3, 2003, provisional application No. 60/497,755, filed on Aug. 26, 2003.

(51) Int. Cl.
*B32B 3/26* (2006.01)

(52) U.S. Cl. ................. 428/319.1; 428/316.6; 428/74; 428/76; 296/39.3

(58) Field of Classification Search ............. 428/316.6, 428/319.1, 74, 76; 296/39.3
See application file for complete search history.

(56) References Cited

U.S. PATENT DOCUMENTS

| | | | |
|---|---|---|---|
| 3,133,612 A | 5/1964 | Sailler | |
| 3,237,716 A | 3/1966 | Parsons | |
| 3,413,803 A | 12/1968 | Rosenlund et al. | |
| 3,505,028 A | 4/1970 | Douthit | |
| 3,740,353 A | 6/1973 | Patrick et al. | |
| 3,770,560 A | 11/1973 | Elder et al. | |
| 3,833,951 A * | 9/1974 | Hurwitz | 5/698 |
| 3,863,445 A | 2/1975 | Health | |
| 3,894,169 A | 7/1975 | Miller | |
| 3,908,372 A | 9/1975 | Fowler et al. | |
| 3,963,087 A | 6/1976 | Grosseau | |
| 4,022,019 A | 5/1977 | Garcea | |
| 4,028,158 A * | 6/1977 | Hipchen et al. | 156/79 |

(Continued)

FOREIGN PATENT DOCUMENTS

DE 2037135 9/1971

(Continued)

OTHER PUBLICATIONS

English Abstract of DE 1949657 B, Elektroakusztikai Gyar, "Foam filled lightweight noise screen wall panel has reinforcing ribs on unequally thickn plates and filler," Sep. 1977.*

(Continued)

*Primary Examiner*—Hai Vo
(74) *Attorney, Agent, or Firm*—Pearne & Gordon LLP

(57) ABSTRACT

A foam barrier heat shield is provided having a layer of foam adhesively disposed between opposing first and second metallic outer layers. The foam is expanded in between the outer layers and is adhesively formed to the outer layers without the use of a separate adhesive. In addition to shielding heat, the heat shield is effective as a noise barrier and is internally damped against vibration. In a preferred embodiment, the foam is a substantially rigid polyurethane foam that is sufficiently pliant to be bent to and accommodate a particular shape and contour to which the heat shield will conform in use, and it is reversibly deformable acoustical deflections.

27 Claims, 4 Drawing Sheets

U.S. PATENT DOCUMENTS

| | | |
|---|---|---|
| 4,085,816 A | 4/1978 | Amagai et al. |
| 4,099,590 A | 7/1978 | Martin, Sr. |
| 4,118,258 A | 10/1978 | Graveron et al. |
| 4,118,543 A | 10/1978 | Donohue |
| 4,133,932 A | 1/1979 | Peck |
| 4,142,605 A | 3/1979 | Bosch |
| 4,191,798 A | 3/1980 | Schumacher et al. |
| 4,194,484 A | 3/1980 | Kirchweger et al. |
| 4,308,093 A | 12/1981 | Bodendorf et al. |
| 4,311,751 A | 1/1982 | Brueggemann et al. |
| 4,374,172 A | 2/1983 | Schwarz et al. |
| 4,432,433 A | 2/1984 | Ogawa |
| 4,433,542 A | 2/1984 | Shimura |
| 4,438,166 A | 3/1984 | Gluck et al. |
| 4,456,705 A | 6/1984 | McCarthy |
| 4,468,499 A | 8/1984 | Siegfried et al. |
| 4,482,414 A | 11/1984 | Schonberger |
| 4,487,289 A | 12/1984 | Kicinski et al. |
| 4,495,240 A | 1/1985 | McCarthy |
| 4,511,679 A | 4/1985 | Ariyoshi et al. |
| 4,525,406 A * | 6/1985 | Pollock ...................... 428/137 |
| 4,557,970 A * | 12/1985 | Holtrop et al. ........... 428/316.6 |
| 4,584,232 A | 4/1986 | Frank et al. |
| 4,612,767 A | 9/1986 | Engquist et al. |
| 4,636,425 A | 1/1987 | Johnson et al. |
| 4,678,707 A | 7/1987 | Shinozaki et al. |
| 4,709,781 A | 12/1987 | Scherzer |
| 4,734,323 A | 3/1988 | Sato et al. |
| 4,740,427 A | 4/1988 | Ochiumi et al. |
| 4,766,028 A | 8/1988 | Rich |
| 4,769,271 A | 9/1988 | Sekimoto |
| 4,781,774 A | 11/1988 | Steward et al. |
| 4,800,984 A | 1/1989 | Kerman |
| 4,803,105 A | 2/1989 | Kretow et al. |
| 4,823,909 A | 4/1989 | Nakamura et al. |
| 4,830,908 A | 5/1989 | Nakajima et al. |
| 4,839,397 A * | 6/1989 | Lohmar et al. ........... 428/316.6 |
| 4,842,938 A | 6/1989 | Rizk et al. |
| 4,851,271 A | 7/1989 | Moore, III et al. |
| 4,883,717 A | 11/1989 | Kitamura et al. |
| 4,887,788 A | 12/1989 | Fischer et al. |
| 4,906,501 A | 3/1990 | Honma et al. |
| 4,914,912 A | 4/1990 | Akatsuka |
| 4,923,904 A * | 5/1990 | Hasegawa et al. ........... 521/115 |
| 4,930,678 A | 6/1990 | Cyb |
| 4,938,819 A | 7/1990 | Ishii et al. |
| 4,966,799 A | 10/1990 | Lucca et al. |
| 4,972,674 A | 11/1990 | Yamada et al. |
| 4,987,194 A | 1/1991 | Maeda et al. |
| 5,008,324 A | 4/1991 | Killgoar, Jr. et al. |
| 5,021,108 A | 6/1991 | Bergqvist |
| 5,066,708 A | 11/1991 | Koller, Sr. et al. |
| 5,094,318 A | 3/1992 | Maeda et al. |
| 5,114,755 A | 5/1992 | Canaday et al. |
| 5,129,975 A | 7/1992 | Easterle et al. |
| 5,143,755 A | 9/1992 | Moore, III et al. |
| 5,160,783 A | 11/1992 | Nemoto et al. |
| 5,162,156 A | 11/1992 | Troughton, Jr. et al. |
| 5,167,060 A | 12/1992 | Nawrocki et al. |
| 5,190,986 A | 3/1993 | Allen et al. |
| 5,196,253 A | 3/1993 | Mueller et al. |
| 5,213,879 A | 5/1993 | Niwa et al. |
| 5,233,832 A | 8/1993 | Moore, III et al. |
| 5,245,141 A | 9/1993 | Fortez et al. |
| 5,266,143 A | 11/1993 | Albera et al. |
| 5,266,374 A | 11/1993 | Ogata |
| 5,271,612 A | 12/1993 | Yada et al. |
| 5,271,879 A | 12/1993 | Saatchi et al. |
| 5,299,335 A * | 4/1994 | Ivester et al. ................... 5/641 |
| 5,300,355 A | 4/1994 | Mifune et al. |
| 5,318,837 A | 6/1994 | Yoshinaka et al. |
| 5,350,610 A | 9/1994 | Mashita et al. |
| 5,464,952 A | 11/1995 | Shah et al. |
| 5,473,122 A | 12/1995 | Kodiyalam et al. |
| 5,483,028 A | 1/1996 | Holwerda |
| 5,487,928 A | 1/1996 | Fujimoto |
| 5,493,081 A | 2/1996 | Manigold |
| 5,536,556 A | 7/1996 | Juriga |
| 5,554,831 A | 9/1996 | Matsukawa et al. |
| 5,562,791 A | 10/1996 | De Groot |
| 5,567,922 A | 10/1996 | Schmuck et al. |
| 5,578,800 A | 11/1996 | Kijima |
| 5,635,562 A | 6/1997 | Malcolm |
| 5,681,072 A | 10/1997 | Stricker |
| 5,741,390 A | 4/1998 | Schmuck et al. |
| 5,849,407 A * | 12/1998 | Seibert ...................... 428/316.6 |
| 5,858,521 A | 1/1999 | Okuda et al. |
| 5,895,013 A | 4/1999 | Towfiq |
| 5,908,591 A | 6/1999 | Lewit et al. |
| 5,928,772 A | 7/1999 | Shiraishi et al. |
| 5,945,643 A | 8/1999 | Casser |
| RE36,323 E | 10/1999 | Thompson et al. |
| 6,024,190 A | 2/2000 | Ritzema |
| 6,066,580 A | 5/2000 | Yoshida et al. |
| 6,092,622 A | 7/2000 | Hiers et al. |
| 6,093,481 A * | 7/2000 | Lynn et al. ................... 428/217 |
| 6,096,416 A | 8/2000 | Altenberg |
| 6,102,465 A | 8/2000 | Nemoto et al. |
| 6,110,985 A | 8/2000 | Wheeler |
| 6,123,171 A | 9/2000 | McNett et al. |
| 6,123,172 A | 9/2000 | Byrd et al. |
| 6,145,617 A | 11/2000 | Alts |
| 6,279,229 B1 | 8/2001 | Lemke et al. |
| 6,288,133 B1 | 9/2001 | Hagquist |
| 6,290,021 B1 | 9/2001 | Strandgaard |
| 6,302,466 B1 * | 10/2001 | Zwick ........................ 296/39.3 |
| 6,309,985 B1 | 10/2001 | Virnelson et al. |
| 6,391,438 B1 | 5/2002 | Ramesh et al. |
| 6,455,148 B1 * | 9/2002 | Spears et al. ............. 428/319.1 |
| 6,497,947 B1 | 12/2002 | Blais et al. |
| 6,524,691 B2 | 2/2003 | Sugawara et al. |
| 6,550,868 B2 | 4/2003 | Kobayashi et al. |
| 6,554,101 B2 | 4/2003 | Watanabe et al. |
| 6,555,246 B1 | 4/2003 | Zwick |
| 6,579,170 B1 * | 6/2003 | Davis ........................... 454/232 |
| 6,623,674 B1 | 9/2003 | Gehlsen et al. |
| 6,645,586 B2 * | 11/2003 | Ohira et al. ................. 428/35.7 |
| 6,955,845 B1 * | 10/2005 | Poole et al. .................... 428/76 |
| RE39,260 E | 9/2006 | Byrd et al. |

FOREIGN PATENT DOCUMENTS

| | | |
|---|---|---|
| DE | 1949657 B * | 9/1977 |
| DE | 3800740 | 8/1989 |
| EP | 636517 | 2/1995 |
| EP | 680866 | 11/1995 |
| GB | 1287606 | 9/1972 |
| GB | 2216081 | 10/1989 |
| JP | S54-24356 | 2/1978 |
| SU | 244806 | 10/1969 |
| WO | WO 9014944 A1 * | 12/1990 |
| WO | 98/18657 | 5/1998 |

OTHER PUBLICATIONS

The "Dynamat and Automotive" article, 1991-2005, 1 page.*
"Anti Damping and Thermoplastic Elastmer VS-POLYMER", Kuraray Co., Ltd. Tokyo, Japan, Aug. 1993, pp. 1-15.
"Damping and Thermoplastic Rubber VS-POLYMER", Kuraray Co., Ltd., Tokyo, Japan, Aug. 1995, pp. 1-15.
"HYBRAR-New TPE with Vibration Damping Effect", Kuraray Co., Ltd., Tokyo, Japan, Mar. 11, 1993 pp. 1-14.

Kirk-Othmer "Concise Encyclopedia of Chemical Technology", John Wiley & Sons, Inc., 1985, pp. 518-521.

Thiokol Propulsion, TCR, (Composite Resin System), Thiokol Propulsion, TCR, 1998, 7 pages.

Carborundum Company, "Fiberfrax Ceramic Fiber Paper" brochure, 1990, 3 pages.

* cited by examiner

FOAM BARRIER HEAT SHIELD

This application claims the benefit of U.S. Provisional Patent Application Ser. Nos. 60/475,560 filed Jun. 3, 2003, and 60/497,755 filed Aug. 26, 2003, the contents of each of which are incorporated herein by reference in their entirety.

BACKGROUND OF THE INVENTION

The invention relates to a damping system for damping vibrational and other noise in passenger vehicles. More particularly, the invention relates to a system that is effective to block noise and vibration, and as a heat shield.

Automobiles are by their nature very noisy machines. Engine combustion, high velocity exhaust flow, rotating bearings, rotating transmission and axle linkages, other high speed and/or high shear moving parts, and high speed tire-road contact all generate a significant amount of noise and structural vibration, particularly at high vehicle speed. All this noise can make the passenger cabin of a traveling vehicle very uncomfortable for passengers, if not unbearable.

In addition, many automobiles components that generate a substantial amount of noise also generate a substantial amount of heat, e.g., the exhaust manifold, catalytic converter, etc. These components are located in close proximity to other components which must be shielded or insulated from heat in order to ensure maximum performance and service life. In addition, the underbody (floor pan) of the automobile must be shielded from certain underbody components, the exhaust pipes and catalytic converter in particular. If unshielded, heat from the exhaust system may be conducted through the underbody into the passenger compartment, making it uncomfortable for passengers.

Many heat-source components, in addition to generating substantial quantities of heat, also are the source of significant vibration and noise. This is because many of the sources of heat (for example exhaust gases) also are sources of vibration (due to frictional forces between passing high velocity gas and pipe walls). Conventional technologies employ separate components to damp vibration/noise and to insulate or shield against heat. Otherwise, in the case of many heat-generating components, a heat shield is provided to prevent damage to adjacent components but no noise absorption/blocking means is provided, either due to weight considerations or the potential for heat damage.

Commonly, the result can be a vibratory exhaust system that is heat-shielded but has no or inadequate vibration or noise reduction means despite being a substantial noise/vibratory source. The result is that the comfort of automobile passengers in the passenger compartment is diminished because there is insufficient noise or vibration attenuation mechanism to reduce noise emanating from high temperature components such as the catalytic converter.

Conventional heat shields applied to these situations consist of either single or layered (laminate) aluminum. This material is sometimes embossed to increase the thermal protection. Another type of material that is used is an air gap heat shield, a shield that is "blown-up" to increase the thermal protection. A third technology that is used is a denim barrier with foil on one side, which has been used to try to reduce noise as well as heat. These conventional technologies all fall short of providing adequate thermal shielding at desirably low weight, and none of them provides any substantial measure of noise abatement.

There is a need in the art for a heat shield that also functions as an effective vibration and/or noise barrier. Such a heat shield preferably will be effective up to temperatures of 1250° F., and will be at least as effective, preferably more effective, at abating tonal frequencies in the range of 20-2000 Hz as conventional systems, but will weigh less.

SUMMARY OF THE INVENTION

A heat shield is provided having a first metallic outer layer, a second metallic outer layer, and a foam layer disposed in between the first and second metallic outer layers. The first metallic outer layer has a thickness of 0.001-0.02 inches.

A heat shield is provided having a metallic outer layer, a semi-rigid foam layer made from a first foam material adhered to the metallic outer layer, and a foam layer absorber made from a second foam material, dissimilar to the first foam material, adhered to the semi-rigid foam layer opposite the metallic outer layer.

An automobile body panel is also provided having a heat shield fastened or mounted to the body panel. The heat shield has a first metallic outer layer, a second metallic outer layer, and a foam layer disposed in between the first and second metallic outer layers. The first metallic outer layer has a thickness of 0.001-0.02 inches.

DETAILED DESCRIPTION OF PREFERRED EMBODIMENTS OF THE INVENTION

As used herein, when a range such as 5-25 (or 5 to 25) is given, this means preferably at least 5 and, separately and independently, preferably not more than 25. Also as used herein, the term "area density" refers to the weight or mass of a 1 square foot section of a particular heat shield or material. For example, a heat shield having an area density of 0.5 lb/ft$^2$ means a 1 square foot section of that heat shield weighs 0.5 pounds. Another way to think of area density is as the weight per area of a heat shield.

A foam barrier heat shield is provided. According to a first preferred embodiment, the heat shield is a sandwich composite having the following layers:

outer layer:foam layer:outer layer

Figure 3:
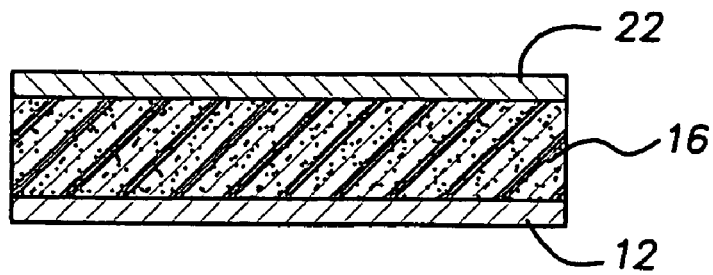
FIG. 3 is a cross-section of a heat shield according to a preferred embodiment of the invention.

A foam barrier heat shield 10 according to the above embodiment is shown diagrammatically in FIG. 3. Each of the outer layers 12, 22 preferably is made of a metallic material capable of withstanding the temperatures to which the heat shield 10 will be exposed, typically up to about 1250° F. The outer layers 12, 22 can be made from stainless steel, aluminized steel, coated steel, or other nonferrous metals, most preferably aluminum. Other metals or metal alloys also can be used. Aluminum is preferred due to its wide availability, low cost, light weight and thermal conductivity. Each of the outer layers 12, 22 has a layer thickness of 0.001-0.02 inches, preferably 0.002-0.01, preferably 0.003-0.008, preferably 0.004-0.005; alternatively the outer layer thicknesses can be in the range of 0.001-0.005. It will be evident from the above thickness ranges that the outer layers 12, 22 typically are provided as thin metallic foils. It is riot necessary, though it is desirable in many applications, that both outer layers 12 and 22 be of the same material and/or substantially the same thickness.

The inner foam layer 16 is made from a foam material capable or effective to withstanding the operative heat shield temperatures (1000-1250° F.), but which will provide a degree of sound damping, particularly at lower tonal frequencies, e.g. below 2000 Hz, preferably below 250 Hz. Also, the foam layer serves to dampen vibration of the metal outer layer(s) of the heat shield 10, which is an important feature as will become further evident herein. In a preferred embodiment, the foam material for layer 16 is provided from an expandable foaming composition such that it expands and uniformly fills the space between opposing outer layers 12 and 22 according to a preferred method of making the heat shield 10 as described more fully below. Suitable foams for use in the present invention that are or can be made from expandable foaming precursor compositions include polyethylene, polypropylene, ethyl vinyl acetate (EVA), as well as other polymeric foam(s). Preferably, the foam in layer 16 is a semi-rigid foam, preferably a semi-rigid polyurethane.

By "semi-rigid," it is meant that the foam is a substantially rigid (i.e. not viscoelastic) foam, yet it does have limited viscoelastic properties such that 1. the layer 16 is sufficiently pliant that it can be bent to accommodate a particular shape or contour to which the heat shield 10 will be bent and must conform in use, but whose cellular structure will not be appreciably or substantially damaged by such bending, and 2. the foam is acoustically deflectable, meaning that it can reversibly deform or deflect from the force of an impacting acoustical wave to a sufficient extent to effectively absorb or redirect a portion of the acoustical energy and thereby dampen the noise associated with the wave. Generally, a foam is characterized as viscoelastic if it is recoverable following a deflection or deformation with little or no delay once the deforming influence has been removed. The "semi-rigid" foam referred to herein is so characterized because it is generally not a viscoelastic foam, meaning that it generally is not recoverable en masse or in bulk upon deflection, nevertheless it is said to retain limited viscoelastic properties because it does retain the ability to recover following an acoustical deflection induced by an impacting acoustical wave. These deflections occur only at the surface of the foam, and do not penetrate into the volume of the foam any substantial extent; penetration depths of acoustic deflections typically are on the order of nanometers to micrometers. To illustrate, for a foam layer of 0.16 inches (3.8 mm) thickness (see next paragraph) that undergoes an acoustical deflection of 1 nm-1 μm, this equates to about 0.0004-0.4% deflection compared to the total overall thickness of the foam layer.

The foam layer 16 has a thickness of 0.005-0.75 inches, preferably 0.008-0.7, preferably 0.01-0.6, preferably 0.02-0.5, preferably 0.03-0.4, preferably 0.04-0.3, preferably 0.05-0.25, preferably 0.06-0.225, preferably 0.07-0.2, preferably 0.1-0.175, preferably 0.15-0.17, inches. The foam layer 16 thickness is selected to maximize strength of the layer while taking into account cost considerations for the material.

For the preferred semi-rigid polyurethane foam layer, the polyurethane is made (expanded) between the two outer layers 12 and 22 (more fully described below) from a two-part composition, the first part being a polyol blend composition and the second part being an isocyanate composition. The polyol blend composition can include a single polyol or a mixture of polyols. A preferred polyol blend composition according to the invention is a mixture of two polyols. The first polyol has a molecular weight of 200-600, preferably 420-460, and a hydroxyl number of 200-600, preferably 350-400. The second polyol has a molecular weight of 2000-8000, preferably 4500-5000, an a hydroxyl number of 10-200, preferably 30-50. These two polyols are combined to provide a preferred polyol blend composition such that the weight ratio of the first polyol to the second polyol is in the range of 25:75 to 75:25, more preferably 40:60 to 60:40. A suitable commercial product for the first polyol above is Multranol 4035, from Bayer Corporation. Multranol 4035 is a sucrose based polyether polyol having a molecular weight of 438 and a hydroxyl number of 380. A suitable commercial product for the second polyol above is Multranol 3900, also from Bayer Corporation. Multranol 3900 is a glycerin based flexible polyether polyol having a molecular weight of 4800 and a hydroxyl number of 35. Alternatively, other suitable and commercially available polyols can be selected by those of ordinary skill in the art for the first and second polyols respectively as described above. Alternatively, three or more polyols may be combined to provide the polyol blend composition according to the invention.

Optionally and preferably, the polyol blend composition also is provided with a surfactant, a catalyst and a foaming agent, as well as other suitable or conventional components for foaming mixtures. The surfactant preferably is a silicone surfactant or a mixture of silicone surfactants such as DABCO DC 5164 silicone surfactant and DABCO DC 5169 silicone surfactant, both from Air Products and Chemicals Inc. Less preferably, other suitable surfactants known in the art may be used.

The catalyst component preferably is an amine catalyst, more preferably a mixture of amine and tin based catalysts. DABCO 33LV from Air Products and Chemicals, Inc. is a trimethylenediamine catalyst in dipropylene glycol, and is preferred in the present invention. Metacure T-1, also from Air Products, is a dibutyl tin acetate catalyst and is a preferred tin based catalyst in the present invention. Alternatively, a single amine catalyst may be used or another combination of suitable amine and tin catalysts known in the art may be used.

The preferred foaming agent is water. Alternatively, chemical foaming agents known in the art, e.g. azodicarbonamide and/or p,p'-Oxybis benzenesulfonyl hydrazide (OBSH), can be used.

The isocyanate composition preferably is or includes Mondur MA2300 from Bayer Corporation. Mondur MA2300 is an allophanate-modified MDI (diphenylmethanediisocyanate) having two isocyanate reactive sites. The allophanate-modified MDI is preferred because, unlike unmodified MDI, the allophanate-modified MDI prepolymer can be a liquid at standard temperature and pressure (298K and 1 atm). This greatly simplifies processing. The allophanate-modified MDI molecule has an effective isocyanate concentration of about 20-30 weight percent, meaning that about 20-30 weight percent of the modified MDI molecule is comprised of the two isocyanate (NC=O) reactive sites per molecule. It is conventional, when referring to the weight of isocyanate (NC=O) added to a foaming composition to state the weight contributed specifically by the NC=O active sites, excluding the residual weight of the molecule to which the active sites are attached.

Alternatively and less preferably, other isocyanates may be used such as Isonate 143L from Dow Chemical Corporation, and less preferably other isocyanate formulations from other manufacturers. It is important, however, when using other isocyanate formulations to take into account their respective effective weight percent concentrations of active NC=O sites.

Several or all of the surfactant, catalyst, blowing agent and other components described above can be provided together with the isocyanate (preferably Mondur MA2300) in the isocyanate composition instead of in the polyol blend composition. Though it is preferred these other components be provided in the polyol blend composition such that the isocyanate composition comprises substantially 100 weight percent of the isocyanate formulation, preferably Mondur MA2300. However the components are apportioned, on combining the polyol blend and isocyanate compositions, the resulting foaming composition preferably has the following composition listed below in table 1. In table 1, any reported weight percent or weight percent range of any component, can be combined with any other weight percent or weight percent range for any of the other components; it is not necessary that all weight percents or weight percent ranges come from the same column.

TABLE 1

Preferred foaming composition

| Component | Preferred form/source | weight percent | | |
|---|---|---|---|---|
| | | Preferred | Less Preferred | Less Preferred |
| First polyol | Multranol 4035 | 20-21 | 17-25 | 10-40 15-30 |
| Second polyol | Multranol 3900 | 30-32 | 25-35 | 20-50 25-40 |
| Isocyanate | Mondur MA2300 | 45-48 | 42-49 | 30-55 40-50 |
| Tin catalyst | Metacure T-1 | 0.01-0.1 | 0.01-0.2 | 0-0.5 0-0.3 |
| Amine catalyst | DABCO 33LV | 0.6-0.8 | 0.5-1 | 0.2-2 0.4-1.2 |
| Surfactant A | DABCO DC5164 | 0.4-0.6 | 0.3-0.8 | 0-1.5 0.2-1 |
| Surfactant B | DABCO DC5169 | 0.1-0.4 | 0.1-0.5 | 0-1 0-0.7 |
| Foaming agent | Water | 0.5-1 | 0.4-2 | 0.1-5 0.3-3 |
| Index | | 100 | 90-110 | 60-130 |

In table 1, the weight percent concentrations listed for the isocyanate component are reported for the case when Mondur MA2300 is used, i.e. 45-48 weight percent Mondur MA2300 is called for in the most preferred embodiment listed in table 1. Taking into consideration the weight percent proportion of active NC=O (isocyanate) sites in Mondur MA2300 (about 20-30% as described above), this corresponds to about 9-14.4% active NC=O sites in the most preferred composition from table 1. Preferably, the isocyanate concentration (exclusive of residual molecule weight) is about 10.5-12.5 or 11-12, less preferably 8-14, less preferably 6-16, less preferably 5-20, weight percent excluding the weight of the molecule(s) to which the NC=O groups are attached. Similarly, if other isocyanate formulations are used, their respective weight percent proportions of active NC=O sites should be taken into consideration when determining the corresponding weight percent of the total isocyanate formulation necessary to provide a foaming composition in accordance with table 1 and the present invention.

The index of the composition listed in table 1 refers to the stoichiometric ratio of polyol reactive sites to isocyanate reactive sites in the overall composition as will be understood by a person of ordinary skill in the art. An index of 100 indicates a stoichiometric balance of polyol to isocyanate reactive sites. An index above 100 indicates an excess of isocyanate and an index below 100 indicates an excess of polyol.

Other additives known in the art also can be included in the composition, such as fillers, colorants, flame retardants, antimicrobials, etc., and these preferably are provided initially in the polyol blend composition as described above, though less preferably they may be provided initially in the isocyanate composition.

Figure 1:
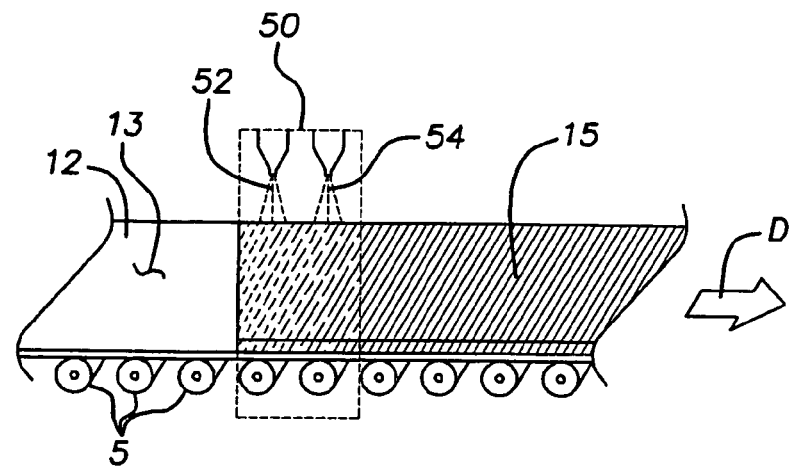
FIG. 1 is a schematic diagram showing a first part of a manufacturing process for a heat shield according to the invention.

The heat shield according to the above-described embodiment preferably is made as follows. Referring to FIG. 1, the first outer layer 12 is provided and conveyed by a conveyor system 5 as a continuous sheet in a substantially horizontal direction (arrow D). The first outer layer 12 sheet is conveyed past a foam application station 50 where liquid foam precursors (two-part foaming composition, one part being the polyol blend composition 52 and the other part being the isocyanate composition 54) are sprayed directly onto a face 13 of the passing first outer layer 12 sheet. Thus, at the foam application station, the foam precursors are applied to the face 13 of the first outer layer 12 sheet to provide an uncured foaming composition layer 15, having all components of the respective polyol blend and isocyanate compositions 52 and 54. The polyol blend composition 52 is premixed and includes all polyol components, and preferably also the blowing agent, catalyst and surfactants as described above.

Figure 2:
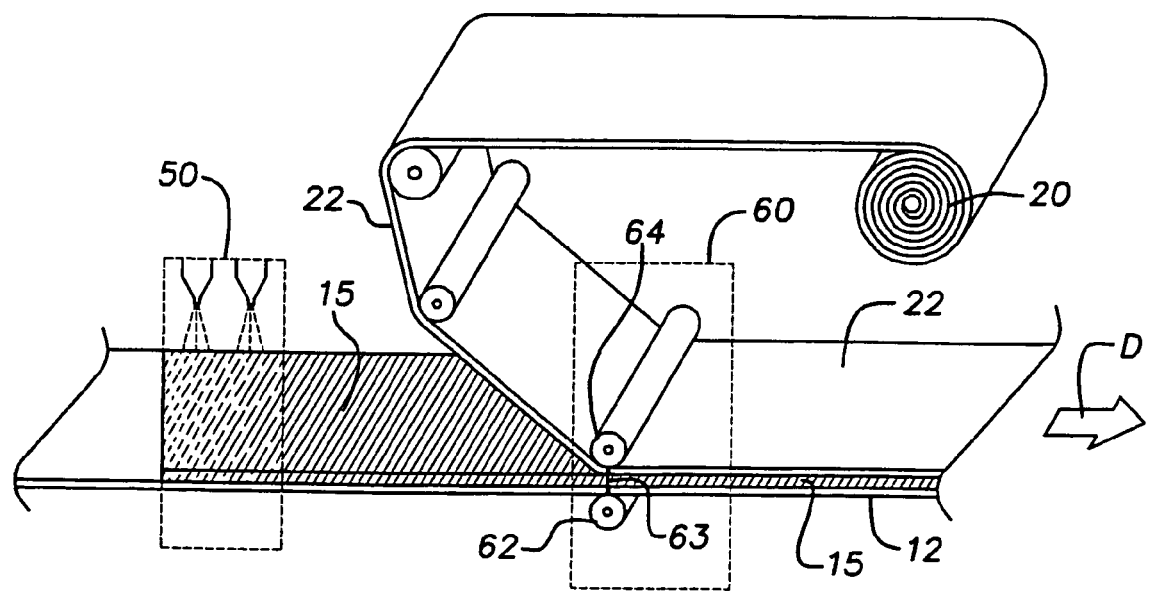
FIG. 2 is a schematic diagram showing a second part of a manufacturing process for a heat shield according to the invention.

After the foam application station 50, and prior to substantial initiation of foaming (blowing or expanding of the foaming composition to yield the foam), the first outer layer 12 sheet and applied foaming composition 15 are conveyed past a second outer layer sheet application station 60 (shown in FIG. 2) where a second outer layer 22 sheet is applied in overlying orientation with respect to the first outer layer 12 sheet directly over the yet-unfoamed precursor composition layer 15, such that the unfoamed composition is sandwiched between the first and second outer layers 12 and 22. The second outer layer 22 sheet can be provided from a roll 20 and fed to the second outer layer sheet application station via a series of rollers as illustrated in FIG. 2. Alternatively, other known or conventional means of supplying the second outer layer sheet 22 can be used without undue experimentation.

As seen in FIG. 2, a pair of gap rollers, lower gap roller 62 and upper gap roller 63, are disposed at the second outer layer sheet application station 60. The lower and upper gap rollers 62 and 64 are parallel rollers whose respective longitudinal axes extend in a transverse direction relative to the direction of travel, D, of the passing web composed of the outer layers 12 and 22 and the intermediate foaming composition layer 15 therebetween. The upper gap roller 64 is spaced vertically a distance from the lower gap roller 62, defining a distance or gap 63 between the lower-most extent of the upper roller 64 and the upper-most extent of the lower roller 62. (The terms "gap" and "distance" are used interchangeably herein to refer to the spacing between the lower and upper gap roller 62 and 64 as described herein and illustrated in FIG. 2). The gap rollers 62 and 64 are disposed such that as the second outer layer 22 sheet is positioned overlying the first outer layer 12 sheet, the resulting three-layer composite (outer layer 12: foaming composition layer 15: outer layer 22) follows a pathway between the lower and upper gap rollers 62 and 64. The distance 63 between the gap rollers 62 and 64 is selected so that after passing the gap rollers, both the first and second outer layer sheets are in uniform or substantially uniform contact with the yet-unfoamed precursor composition 15. The gap roller distance 63 also aids in spreading the liquid precursor composition uniformly between the two outer layer sheets prior to foaming. For a given thicknesses of the first and second outer layers 12 and 22, the thickness of the finished foam layer 16 is affected by appropriate selection of the gap distance 63. For example, in a preferred embodiment the first and second outer layers are each 0.005-inch thick aluminum layers, and the desired foam layer 16 is about 0.1-inch thick semi-rigid polyurethane. To achieve this construction, the two-part foaming composition for the polyurethane foam is provided to a face of the first aluminum outer layer sheet at the foam application station 50 as described above. Then the second aluminum outer layer sheet is applied over the foaming composition, and the resulting sandwich structure is fed past the gap rollers 62 and 64, whose gap distance 63 is selected to be 0.025 inches, which has been found effective to produce the desired finished aluminum-polyurethane-aluminum heat shield according to this embodiment having layer thicknesses of 0.005-0.01-0.005 inches respectively, (allowing for expansion of the foam precursor composition on exiting the gap rollers 62 and 64). Alternatively, if a polyurethane foam layer of about 0.2 inches thickness is desired between two aluminum layers of 0.005 inches thickness, a gap distance 63 of 0.04 inches has been found effective to achieve this result. It will be evident the overall thickness of the finished heat shield 10 will not correspond to the gap 63 because the foam expansion during foaming of the composition 15 contributes to the final overall thickness. Therefore, the gap 63 is selected to correspond to the nominal or desired overall target heat shield thickness as described in this and the next paragraph, taking into consideration the thickness(es) of the outer layer sheet(s).

Preferably, the relative positions of the lower and upper gap rollers are fixed during the manufacture of the heat shield 10 according to the invention, being immovable relative to one another. In other words, the gap rollers 62 and 64 preferably do not supply any external compressive force to urge the first and second outer layer sheets together at the station 60. The gap distance 63 between them is set initially to correspond to the desired or nominal overall heat shield 10 thickness as described above. But the gap distance 63 is not varied or regulated during operation according to the most preferred embodiment for making the heat shields 10 according to the invention.

After passing the gap rollers 62 and 64, the precursor composition 15 foams and expands to provide the foam layer 16, which is an expanded foam layer that foams between, and to, the opposing outer layer sheets. Expansion of the foam layer 16 is not hindered except by the weight of the upper (second) outer layer 22 sheet, and the foam is permitted to expand until it is completely expanded/cured, with the final thickness of the foam layer 16 being ultimately determined by the amount of the precursor composition 15 initially sprayed onto the first outer layer 12 sheet, the weight of the second metal layer sheet, the gap distance 63, and the expansion characteristics of the foam. As the foam layer cures, it expands to fill the entire gap between the first and second outer layer sheets and adhesively forms or bonds to the facing surface of each of these sheets. Accordingly, no separate adhesive or adhesive layer is necessary, and preferably none is provided, between the foam layer 16 and the adjacent adhered-to outer layer 12, 22 sheets. After the foam layer 16 has cured, the resulting sandwich composite is or can be cut (e.g. die cut) into individual, discrete heat shields, each of which is then formable (crush formable) into the desired shape or configuration depending on the location in an automobile where the heat shield will be applied. The resulting heat shield is able to retain the surface contour and shape of the final shape to which it is crush formed, and the foam layer is not damaged or destroyed as a result of crush-forming because it is not a rigid foam, but it is a semi-rigid foam. Most preferably, the semi-rigid foam layer 16, preferably made from polyurethane, in the heat shield 10 is substantially 100% (less preferably at least 99, 98, or 95 percent) recoverable from acoustical deflections. This makes the layer an effective sound barrier at low tonal frequencies.

Figure 4:
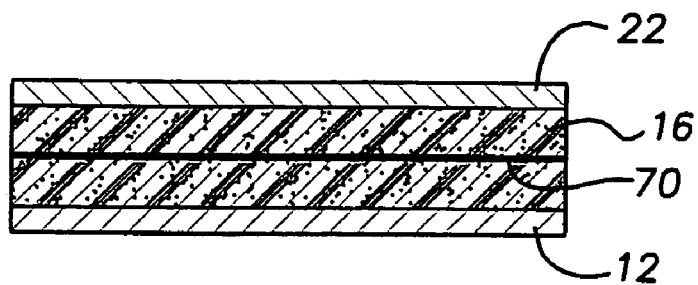
FIG. 4 is a cross-section of a heat shield according to a further preferred embodiment of the invention, having a porous material layer embedded within the foam layer of the heat shield.
Figure 5:
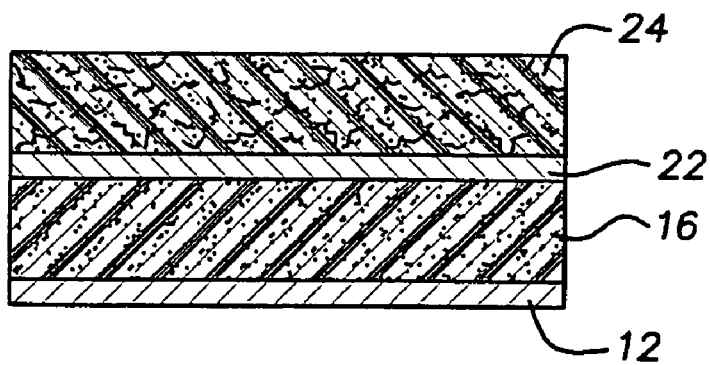
FIG. 5 is a cross-section of a heat shield according to a further preferred embodiment of the invention, having an absorber layer laminated to one of the outer layers, opposite the sandwiched foam layer.

In a further preferred embodiment according to the invention, illustrated in FIG. 4, the heat shield 10 as above described includes a porous material layer 70 embedded within the semi-rigid foam layer 16. Preferably, the porous material layer 70 is a fiber mat made from non-woven or needlepunch polypropylene fibers, such as Geotex 501 from SI Geosolutions. Less preferred are other woven or nonwoven polypropylene fibers or ceramic fibers, e.g. ceramic blanket. Less preferred are other woven or nonwoven polymeric fibers such as polyester fibers. Still less preferred are other permeable materials such as cloth, paper, wire mesh, or plastic mesh.

The porous material layer 70 or fiber mat preferably (though not necessarily) is located centrally within the foam layer 16, spaced substantially equidistant from the opposing first and second outer layers 12 and 22, and has a thickness of about 2-2.5 mm. Preferably, the area density of the porous material layer 70 is in the range of 1-3 oz/yd$^2$ (0.0069-0.021 lb/ft$^2$). The method for making the heat shield 10 having the porous material layer 70 is the same as described above, except that prior to spraying the precursor composition 15 at the station 50, the porous material layer 70 (preferably a polypropylene fiber mat) is laid down on the facing surface of the first outer layer 12 sheet. This two-layer construction is then conveyed to the station 50 where the precursor composition 15 is sprayed on the outer sheet 12 as described above, directly over top of the fiber mat. Then the second outer layer 22 sheet is applied over the precursor composition 15 as above described, and the composition is permitted to foam to produce the foam layer 16. Surprisingly and unexpectedly, it has been discovered that during foaming and curing of the precursor composition 15, the fiber mat migrates upward and ends up substantially centrally positioned within the finished foam layer 16 once curing is complete. Furthermore, during foam curing, the precursor composition (foam) penetrates and permeates the fiber mat resulting in the fiber mat being impregnated with the semi-rigid polyurethane foam in the finished heat shield. When other porous materials are used for the porous material layer 70, it is preferred that such materials are sufficiently porous to accommodate permeation of the precursor composition therethrough so that the porous material layer 70 ends up substantially centrally located within the finished foam layer 16 as described above.

Providing the porous material layer 70 embedded within the foam layer 16 enhances the stiffness of the foam layer 16, which is desirable in some heat shield applications, particularly where it is desirable also to be self supporting over large areas.

In a further preferred embodiment of the invention, the heat shield 10 is provided having an absorber layer 24 laminated to the second outer layer 22, opposite the foam layer 16. The absorber layer 24 preferably is composed of fluffy fibers, and has a thickness of about ¼ to ½ inch. Most preferably, the absorber layer 24 is made up of polyester fluffy fibers (preferably PolyTex™ from Janesville-Sackner Group, Norwalk, Ohio) or polyethylene fluffy fibers. PolyTex™ is a low density thermobonded non-woven material composed of polyester fibers. Alternatively, the absorber layer 24 can be made of any other conventional fibers such as polypropylene, denim, cotton, glass, etc. The absorber layer can be supplied sandwiched between two aluminum scrim sheets, typically less than 0.001 inches thick. In that case, one of these aluminum scrim sheets is used as the second outer layer 22 sheet for the heat shield 10 production method described above, such that the foaming composition 15 (FIG. 2) is sandwiched and expands between the first outer layer 12 sheet on one side, and an aluminum scrim sheet of the absorber 24 on the other, so the overall construction is metal: foam: metal (scrim): absorber: metal (scrim). Alternatively, one or both of the scrim sheets can be made from another substantially nonporous metallic, plastic or fabric material, usually less than 0.001 inch thick. The absorber layer 24 also can be supplied laminated to only a single scrim sheet, in which case the overall construction is metal: foam: metal (scrim): absorber. Or, in an alternate embodiment the overall construction can be metal: foam: absorber: metal (scrim) when the absorber layer 24 is laminated to (facing) the foaming composition 15 with the single scrim sheet facing outward, away from the foam layer 16 in the finished heat shield 10.

Figure 6:
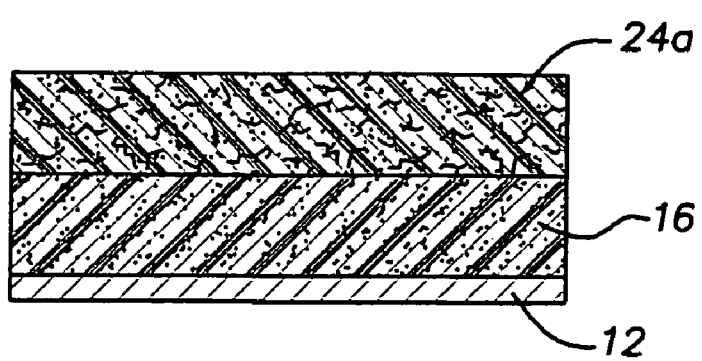
FIG. 6 is a cross section of a heat shield according to a further preferred embodiment of the invention, having a dissimilar foam layer absorber laminated directly to the semi-rigid foam layer.

In a further embodiment according to the invention, illustrated in FIG. 6, the heat shield 10 is an arrangement having the foam layer 16 laminated to the upper surface of the first outer layer 12, and a second, dissimilar foam layer absorber 24a laminated to the upper surface (i.e. facing away from the first outer layer 12) of the foam layer 16; so the overall construction is:

outer layer 12:semi-rigid foam layer 16:dissimilar foam layer absorber 24a

By "dissimilar" foam layer absorber, it is meant that the foam used for absorber 24a is not the same as the foam used for the semi-rigid foam layer 16. Preferably, the outer layer 12 is an aluminum layer, and the semi-rigid foam layer 16 is a semi-rigid polyurethane layer as described above. In this embodiment, the polyurethane foam and first outer layers, 16 and 12 respectively, are provided as described above, and the foam layer absorber 24a is a non-polyurethane foam layer that is provided having no scrim sheets, but otherwise is laminated to the unfoamed liquid precursor composition 15 between the gap rollers 62 and 64. The foam layer absorber 24a preferably is a closed cell foam such as polyvinyl nitrile, and has a thickness in the range of about ¼ to about ½ inch.

The heat shield 10 according to the invention has substantial utility in automotive heat shielding applications where the heat source temperature is less than 1250° F., and the heat shield can be mounted at least 0.25 inches away from the heat source. In automotive applications these conditions exist in many situations. One is an underbody application, shielding the floor boards (floor pan) of a vehicle body from the exhaust system (pipes, catalytic converter, etc.). In this application, the heat shield according to the invention is fastened or mounted to the underside of the floor pan in a conventional manner. Alternatively, the heat shield can be mounted to other body panels in an automobile, wherever it is necessary or desirable to abate both noise and sound, or either of these; e.g. the underside of the automobile hood, the fire wall between the engine compartment and the passenger compartment, door panels, etc. It is noted that when installed in door panels, the heat shield according to the invention is effective to thermally insulate the passenger compartment from the outside environment (keeping heat or a/c inside), while simultaneously blocking outside noise (keeping noise out).

It has been found that the heat shield 10 disclosed herein outperforms conventional heat shielding technologies in terms of amount of heat deflected or dissipated. Furthermore, in addition to providing effective heat shielding, the heat shield 10 acts as a noise barrier, effectively attenuating noise and making the passenger compartment more pleasing to passengers. This combined heat shielding-noise attenuating functionality of the invented heat shield 10 is a substantial advance over the state of the art and conventional technologies, which results in a total heat- and noise-shielding package that can be provided in a single component, minimizing both monetary cost and, more importantly, vehicle weight.

Further aspects of the invention will be understood in conjunction with the following examples, which are provided by way of illustration.

EXAMPLE 1

Four different heat shields 10 according to the invention were made having a semi-rigid polyurethane foam layer. For each of these four heat shields, the foam layer was made from a precursor foaming composition comprised of the following components in the following total weight percents:

| | |
|---|---|
| Multranol 4035 (sucrose-based polyether polyol) | 20.61 |
| Multranol 3900 (glycerin-based polyether polyol) | 30.92 |
| Water | 0.77 |
| DABCO 33LV (amine catalyst) | 0.72 |
| Metacure T-1 (tin catalyst) | 0.05 |
| DABCO DC 5164 (surfactant) | 0.52 |
| DABCO DC 5169 (surfactant) | 0.26 |
| Mondur MA2300 (allophanate-modified MDI (20-30% NCO)) | 46.15 |
| TOTAL = | 100 |

The four heat shields were composed as follows:

Invented 1: The foam layer was sandwiched between two opposing aluminum layers each having a thickness of 0.005 inches. The overall thickness of the heat shield was about 0.1 inches, and its area density was about 0.2 lb/ft$^2$.

Invented 2: The foam layer was sandwiched between two opposing aluminum layers each having a thickness of 0.005 inches. The overall thickness of the heat shield was about 0.15-0.2 inches, and its area density was about 0.25 lb/ft$^2$.

Invented 3: The foam layer was sandwiched between two opposing aluminum layers each having a thickness of 0.005 inches. The foam layer had a fiber mat layer of non-woven polypropylene fibers embedded substantially centrally within the foam layer. The overall thickness of the heat shield was about 0.2 inches, and its area density was about 0.31 lb/ft$^2$.

Invented 4: This heat shield had an outer aluminum layer of 0.005-inch thickness, a polyurethane foam layer of about 0.15-0.2 inches thickness adhered to the aluminum layer, and an absorber layer adhered to the foam layer. The absorber layer was made up of non-woven polyester fluffy fibers, and was supplied adhered on one surface to a scrim sheet made of a substantially non-porous fabric sheet. Thus, the overall construction of this heat shield was:

| I----------------------absorber----------------------I |
|---|
| aluminum - foam - fluffy polyester fibers - nonporous fabric sheet |

The heat shield had an area density of about 0.27 lb/ft$^2$.

EXAMPLE 2

Each of the four heat shields of Example 1 was subjected to a hot box temperature drop study to compare the heat shielding characteristics of each with a number of conventional heat shielding and sound dampening materials. Specifically, the four heat shields of Example 1 were compared to:

"Straight aluminum", a 0.03-inch thick aluminum sheet which is a conventional underbody heat shield in common use, area density of 0.44 lb/ft$^2$;

"Laminated aluminum", which was composed of two sheets of 0.012-inch thick aluminum sheet metal that have been crimped together to form a heat shield—this also is a conventional underbody heat shield, area density of about 0.35 lb/ft$^2$;

"Shoddy", a conventional acoustic absorption material composed of pressed cotton—it is typically made by pressing textile cotton waste or scraps into compressed sheets, and is conventionally used to damp noise (NVH) in automobile body panels, area density of 0.24 lb/ft$^2$; and "Fiberglass", which is a conventional acoustic absorption material composed of a dense fiberglass mat, typically used to dampen engine noise and adhered or laminated to the underside of an automobile hood, area density of 0.24 lb/ft$^2$.

Each of the above materials (the four invented heat shields of Example 1, and the four above-described conventional materials) was tested as follows. A one square foot section of the material was positioned having one surface (the proximal surface) spaced 1 inch away from a point source of heat. For each test, the point source temperature was maintained at a constant 1000° F. Thermocouples were positioned 1) in contact with the material being tested opposite the proximal surface (i.e. in contact with the distal surface), 2) spaced 1 inch away from the distal surface, and 3) spaced 2 inches away from the distal surface, to measure the steady state temperature at all three of these positions. For each test, the three thermocouples were positioned such that the three points at which temperatures were measured fell essentially along a line intersecting the point source, and perpendicular to the surfaces (proximal and distal) of the material being tested. Results of the tests are provided in table 2 below.

TABLE 2

Hot box test results

| Material | Surface Temp (° F.) | 1-inch Temp (° F.) | 2-inch Temp (° F.) |
|---|---|---|---|
| Straight aluminum | 286 | 87 | 83 |
| Laminated aluminum | 213 | 91 | 88 |
| Shoddy | 192 | 107 | 105 |
| Fiberglass | 143 | 86 | 85 |
| Invented 1 | 246 | 84 | 81 |
| Invented 2 | 206 | 83 | 81 |
| Invented 3 | 203 | 87 | 83 |
| Invented 4 | 185 | 90 | 88 |

As evident from table 2, all four of the heat shields according to the invention provided comparable, in some cases better, heat shielding performance compared to the conventional materials, yet the heat shields according to the invention were substantially lighter than either of the conventional aluminum heat shields, and substantially more durable than either the Shoddy or Fiberglass materials. It will be apparent that the heat shields according to the invention preferably have an area density less than about 0.35 lb/ft$^2$ in order to save weight compared to a conventional aluminum heat shield, and more preferably they have an area density of about 0.31 lb/ft$^2$ or less. Neither shoddy nor fiberglass alone could be used as an underbody automobile heat shield due at least to the harsh conditions prevalent under the automobile body.

EXAMPLE 3

Figure 7:
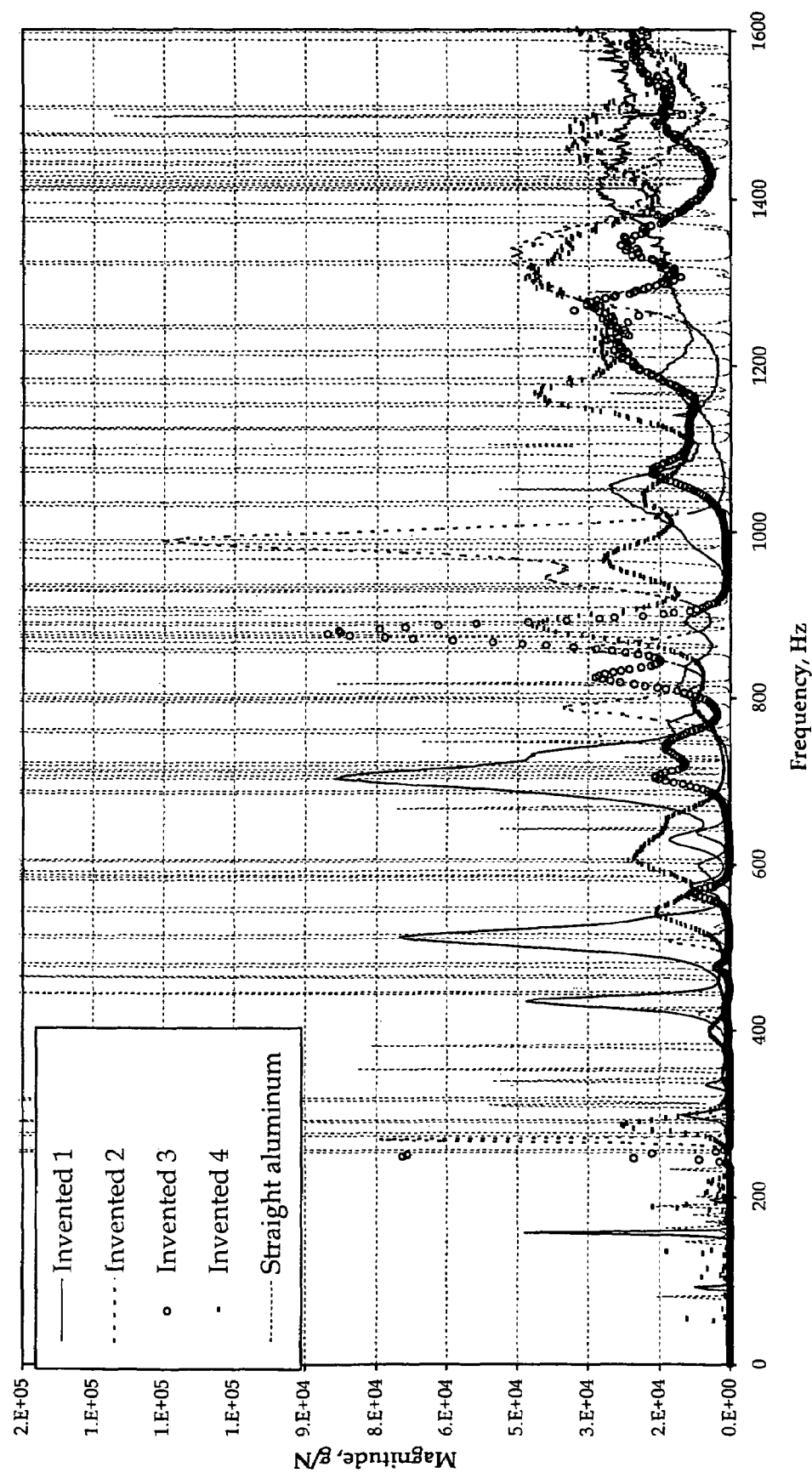
FIG. 7 is a graph showing comparative modal analysis data for four heat shields according to the present invention as well as a conventional straight aluminum heat shield (Example 3).

The four heat shields according to the invention from Example 1, along with the conventional straight aluminum material from Example 2, were subjected to a free-free modal analysis test. Each material was suspended substantially unconstrained by a string to allow for free vibration when impacted. Each of the suspended material samples was then subjected to an impulse from a force hammer. The amount of force supplied on impact and the resulting vibration in each sample were measured to determine the modal resonance or vibration of each material. Results are provided in FIG. 7.

From the figure, it is evident that all four of the invented heat shields that were tested substantially outperformed the conventional aluminum heat shield in terms of the magnitude of vibration or resonance following the impulse. Accordingly, the invented heat shields themselves are a substantially lesser source of vibrational noise due to their own vibration than the conventional aluminum underbody heat shields employed in today's automobiles. This test demonstrates the heat shields according to the invention are effectively internally damped against vibration, which is a heretofore unknown feature of a heat shield.

EXAMPLE 4

Figure 8:
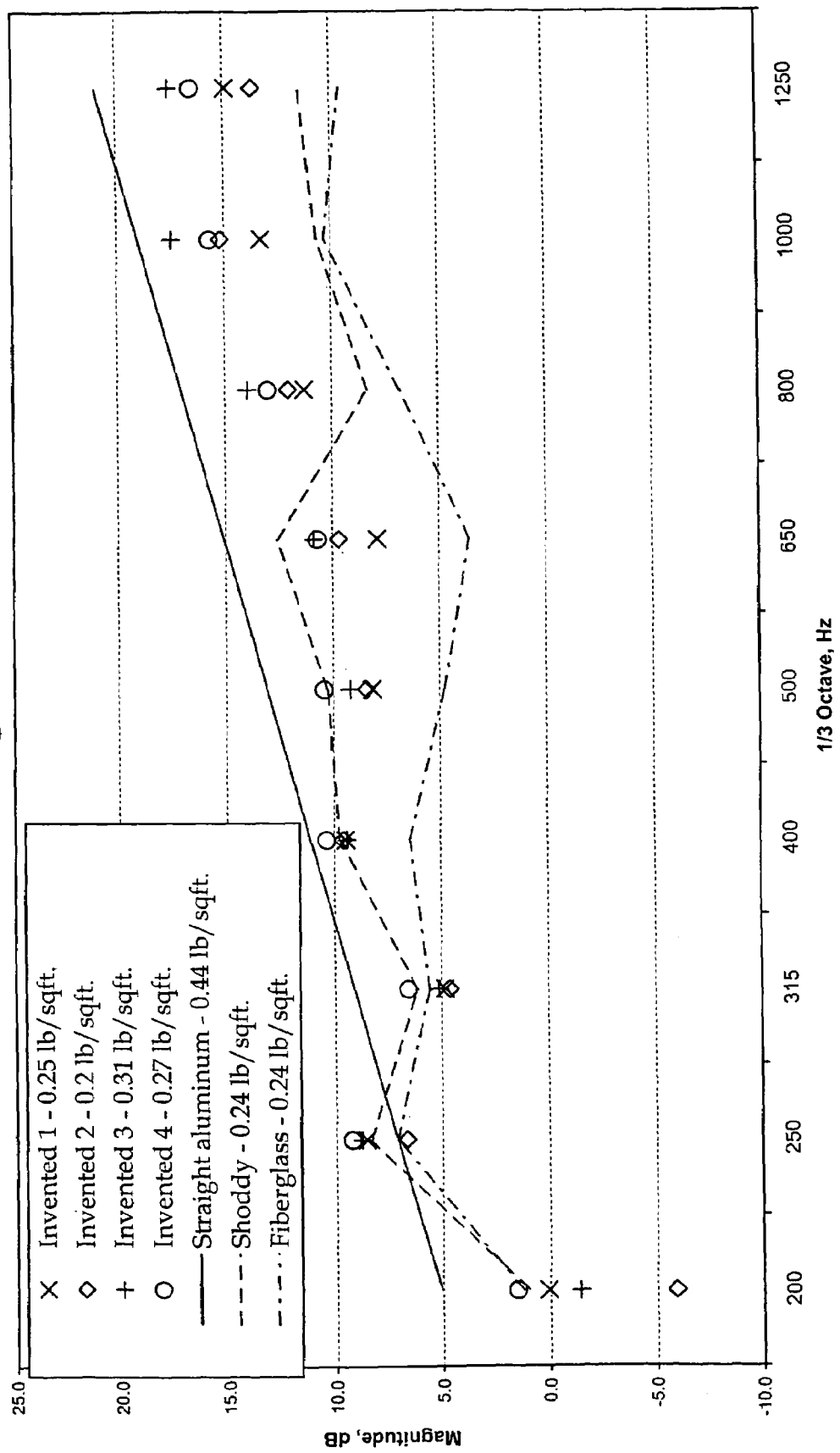
FIG. 8 is a graph a showing comparative loss data for four heat shields according to the present invention, as well a conventional straight aluminum heat shield, and conventional shoddy and fiberglass sound damping materials, according to test method SAE J1400 (Example 4).

The four heat shields from Example 1, as well as the conventional straight aluminum, shoddy and fiberglass materials from Example 2, were subjected to a transmission loss test according to test method SAE J1400: Laboratory Measurement of the Airborne Sound Barrier Performance of Automotive Materials and Assemblies. The transmission loss test measures the loss (attenuation) of sound pressure across a sample of material. To conduct the test, a material sample is placed in between a sound source and a receiver. The source is activated, delivering a sound wave of known or measured initial pressure, intensity, frequency, etc., and the resulting sound pressure on the opposite side the material sample is measured and recorded by the receiver. The results are provided in FIG. 8. As can be seen from the figure, the heat shields according to the invention block noise as well as the non-metal barrier/absorbers, and are nearly as good as the solid aluminum barriers which are 50-100% heavier. Such effective noise attenuation was a highly surprising and unexpected result and was believed to be due, at least in part, to the internal damping characteristics of heat shields according to the invention.

Although the invention has been described with respect to preferred embodiments, it will be understood that various changes or modifications can be made thereto by persons of ordinary skill in the art without departing from the spirit or the scope of the invention as set forth in the appended claims.

What is claimed is:

1. A combination comprising an automobile body panel having a heat shield fastened or mounted to said body panel, said heat shield comprising a first metallic outer layer, a second metallic outer layer, and a foam layer disposed in between said first and second metallic outer layers, said foam layer being deformable to accommodate a particular shape and contour to which the heat shield is to be bent and to generally conform in use without substantially damaging the cellular structure of the foam as a result of such deformation, said foam layer being effective to withstand operative heat shield temperatures of at least 1000° F., and to dampen acoustic tonal frequencies below 2000 Hz.

2. A combination according to claim 1, said first and second metallic outer layers having substantially the same thickness.

3. A combination according to claim 1, said first and second metallic outer layers being made from the same metal or metal alloy.

4. A combination according to claim 1, said foam layer comprising polyurethane foam.

5. A combination according to claim 1, said foam layer comprising a semi-rigid foam.

6. A combination according to claim 1, said foam layer comprising a semi-rigid foam that is reversibly deflectable from the force of an impacting acoustical wave to a sufficient extent to absorb or redirect a portion of the wave's acoustical energy.

7. A combination according to claim 6, said foam being at least 95 percent recoverable from an acoustical deflection.

8. A combination according to claim 1, said foam layer having a thickness of 0.005-0.75 inches.

9. A combination according to claim 1, further comprising a porous material layer embedded within said foam layer.

10. A combination according to claim 9, said porous material layer being a fiber mat being made from non-woven fibers.

11. A combination according to claim 10, said fibers in said porous material layer being polypropylene fibers.

12. A combination according to claim 9, said porous material layer being spaced substantially equidistant from the first and second metallic outer layers, and having a thickness of about 2-2.5 mm.

13. A combination according to claim 1, further comprising an absorber layer comprising fluffy fibers laminated to the second metallic outer layer opposite the foam layer, said absorber layer having a thickness of at least about ¼ inch.

14. A combination to claim 13, said absorber layer comprising polyester fluffy fibers, polyethylene fluffy fibers, or a mixture thereof.

15. A combination according to claim 13, said fibrous absorber layer having a thickness of not more than about ½ inch.

16. A combination according to claim 13, said foam layer being deformable to accommodate a particular shape and contour to which the heat shield is to be bent and to generally conform in use, without substantially damaging the cellular structure of the foam as a result of such deformation.

17. A combination according to claim 1, said foam layer being made from an expandable foaming composition comprising 10-40 weight percent of a first polyol, 20-50 weight percent of a second polyol, 5-20 weight percent isocyanate excluding the weight of the molecule(s) to which the isocyanate groups are attached, 0-0.5 weight percent tin catalyst, 0.2-2 weight percent amine catalyst, 0-2.5 weight percent surfactant, and 0.1-5 weight percent foaming agent, wherein the first polyol has a molecular weight of 200-600 and a hydroxyl number of 200-600, and the second polyol has a molecular weight of 2000-8000 and a hydroxyl number of 10-200.

18. A combination according to claim 17, said first and second polyols being sucrose-based and glycerin-based polyols respectively.

19. A combination according to claim 17, said isocyanate being provided in the form of an allophanate-modified diphenylmethanediisocyanate.

20. A combination according to claim 1, having an area density less than 0.35 lb/ft$^2$.

21. A combination according to claim 1, said heat shield being internally damped against vibration.

22. A combination according to claim 1, said foam layer being effective to dampen acoustic tonal frequencies below 250 Hz.

23. A combination according to claim 1, said foam layer comprising a substantially rigid polyurethane foam that is sufficiently pliant to be bent to and accommodate a particular shape and contour to which the heat shield is to be bent and to generally conform in use, without substantially damaging the cellular structure of the foam as a result of such bending, said polyurethane foam being reversibly deflectable from the force of an impacting acoustical wave to a sufficient extent to absorb or redirect a portion of the wave's acoustical energy.

24. A combination according to claim 1, said foam layer having a thickness of 0.15-0.17 inches.

25. A combination according to claim 1, said foam layer being made as an expanded foam layer between the first and second metallic outer layers, such that the foam layer is adhesively bonded to adjacent surfaces of the respective first and second metallic outer layers without a separate adhesive or adhesive layer.

26. A combination according to claim 1, said foam being reversibly deflectable from the force of an impacting acoustical wave to a sufficient extent to absorb or redirect a portion of the wave's acoustical energy.

27. A combination according to claim 1, said first metallic outer layer having a thickness of 0.001-0.02 inches.

* * * * *

UNITED STATES PATENT AND TRADEMARK OFFICE
CERTIFICATE OF CORRECTION

PATENT NO. : 7,585,559 B2  
APPLICATION NO. : 10/806643  
DATED : September 8, 2009  
INVENTOR(S) : Schroeder et al.

Page 1 of 1

It is certified that error appears in the above-identified patent and that said Letters Patent is hereby corrected as shown below:

Title page, item [56] under References Cited, U.S. Patent Documents, for U.S. Patent No. 3,863,445, replace "Health" with "Heath."

Signed and Sealed this

Twenty-seventh Day of October, 2009

David J. Kappos  
*Director of the United States Patent and Trademark Office*

UNITED STATES PATENT AND TRADEMARK OFFICE
CERTIFICATE OF CORRECTION

PATENT NO. : 7,585,559 B2 Page 1 of 1
APPLICATION NO. : 10/806643
DATED : September 8, 2009
INVENTOR(S) : Schroeder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Fourteenth Day of September, 2010

David J. Kappos
*Director of the United States Patent and Trademark Office*